Patented Oct. 20, 1931

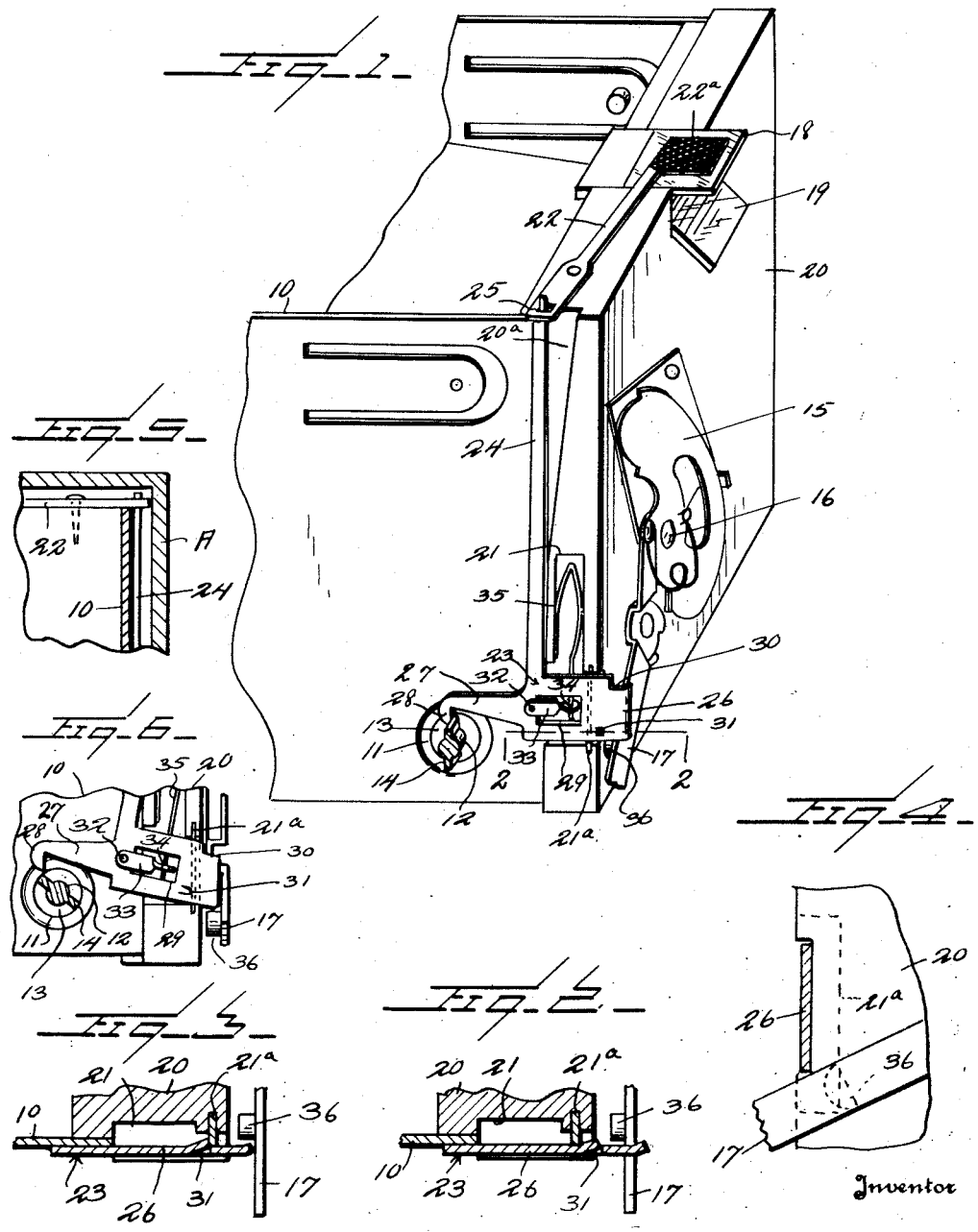

1,828,630

UNITED STATES PATENT OFFICE

CYRUS W. UNDERWOOD, OF CROWLEY, LOUISIANA

PHOTOGRAPHIC CAMERA

Application filed July 8, 1930. Serial No. 466,499.

This invention relates to photographic cameras and particularly to means for preventing double exposures.

The general object of the invention is to provide a very simple and cheaply applied means to this end which operates by automatically disposing a shield over the view finder of the camera when the shutter is snapped, which shield can only be retracted by a rotation of the film winding spool to wind up the exposed film and bring a new tract of film into position for exposure.

A further object is to provide a mechanism of this character in which the shutter release lever is positively locked against shifting movement until the film winding key has been turned to wind up the film, the shield being operatively engaged by and shifted to its non-obstructing position by the rotation of the film winding spool.

A further object is to provide a device of this character which may be made as an attachment, which may be applied to ordinary cameras without any essential change in the construction of the camera, which may be very largely stamped out of sheet metal and which may be cheaply made and readily put in place.

Other objects will appear in the course of the following description.

My invention is illustrated in the accompanying drawings, wherein:—

Figure 1 is a perspective view of a forward end of the inner casing or frame of the camera showing my attachment applied thereto;

Figure 2 is a section on the line 2—2 of Figure 1;

Figure 3 is a like view to Figure 2, but showing the shutter actuating device shifted;

Figure 4 is a fragmentary end view of the camera showing the actuating lever in elevation and the locking member in section;

Figure 5 is a fragmentary vertical section through the camera box and the outside wall thereof and Figure 6 is a detailed elevation showing the position of the locking member or lever after it is retracted by the film winding key.

Referring to these drawings, 10 designates an ordinary camera which I have shown as the inner casing of a box camera, the outer casing being left off. This casing 10 at one side is formed with the aperture 11 through which the shaft of the film spool clutch extends, this shaft having the usual head 13 whereby the shaft may be turned. This shaft is relatively short and extends through the wall of the outer casing and is provided with the usual wings or lugs 14 whereby it is engaged with the extremity of the film spool. The front end wall of the camera carries upon it the usual shutter 15 pivoted at 16, this shutter being actuated by a trigger or lever 17 which projects out beyond the adjacent side wall of the casing 10 and out through the outer box or shell A of the camera.

The means whereby this lever is operatively connected to the shutter forms no part of this invention. The upper end of the camera is shown as being provided with a sight opening 18 and below this sight opening with a mirror 19. It will be understood that any finder of this character may be used, either a prismatic finder or a finder of any type. So far I have described the ordinary construction of a certain type of camera.

As illustrated, the forward end of the casing 10 is formed by a wooden block or like element designated generally 20 upon which the shutter and finder are mounted. In order to provide for mounting my attachment thereon, this wooden block, which projects slightly beyond the sides of the camera on one side is formed with a channel 20ª, which channel extends diagonally downward and rearward and at its lower end is relatively narrow, the side edge of this head 20 being also formed with a longitudinally extending channel or cut-out portion 21.

Pivoted upon the upper end of this head 20 is a lever 22, the inner end of which carries the shield 22ª which is preferably painted black or given some other color which will make it readily observable when viewed through the finder opening of the camera. This lever projects out beyond the side edge of the head 20.

Mounted along the side of the camera is a locking member or lever designated generally 23 having a relatively long, thin finger 24 which is preferably straight, this finger at its extremity having a reduced portion extending upward through an eye 25 formed on the extremity of the lever 22. The lever 23 at its lower end has a forward extension 26, and a rearward extension 27.

This rearward extension terminates in a slightly hook-shaped portion 28 which is disposed between the head 13 and the casing 10 in such position that the hook 28 may be engaged by either one of the lugs 14 on the shaft 12. The forward extension 26 has a slot 29 and the forward extension at its forward end is notched as at 30, this notched portion projecting slightly beyond the front face of the head 20. The portion 26 adjacent its lower corner is indented at 31 from the outside of the portion 26 inwardly so as to provide an inwardly extending protuberance or stop which coacts with a metal plate 21a over which the locking member or lever 23 rides. Pivoted at 32 on the lever 23 is a link 33, which extends forward in the slot and at its end is formed with an eye 34. Disposed within the recess 21 is a spring 35 which bears against the rear wall of the recess, then extends downward against the forward wall of the recess, and then extends downward through the eye 34. This spring, therefore, tends to throw the lower end of the lever forward and to rock this lever so that the upper end of the lever is thrown rearward. The trip lever or trigger 17 is formed on its inner face with a cam protuberance 36 which when the trip lever or trigger is operated to shift it, bears against the projecting end of the lever 23 and pushes the lever laterally outward sufficiently far that the projection 31 escapes from the recess 21, thus permitting the lever 23 to rock under the action of the spring. (See Figure 6.)

The operation of this mechanism is as follows:—Assuming that the camera is loaded and that an unexposed film is disposed behind the lens opening of the camera and the shutter is closed, then the shield 22a will be in a retracted position, the finger 24 will extend upward and forward and the rear end 27 of the lever 23 will be lifted.

When the shutter actuating lever 17 is shifted, as for instance, by forcing it downward, it acts to shift the projection 31 laterally over the plate 21a and the moment this occurs and the lever 17 is shifted beyond the extremity of the portion 26 of the lever 23, the spring will act to shift the lever 23 into such a position that the finger 24 will be moved rearward and the rear end 27 of the lever 23 will be shifted downward so as to carry the hook or lug 28 into the path of movement of one of the lugs 14 on the winding key. The lever then bears against head 20. Under these circumstances, the shield is carried into such a position as to block any view through the view finder so that if an attempt be made to take a picture, the operator looks through the view finder, is unable to see the view and realizes that he has not wound up the exposed portion of the film. He, therefore, rotates the key 13 and as he does so, one of the lugs 14 will come against the hook 28 and retract the lever 23, which will cause the lever to swing upon its pivot 32 and the finger 24 to move forward, thus shifting the shield 22a out of its obstructive position. As soon as the lever 23 is shifted by the key, the punch or projection 31 will engage against the wall of the recess 21 and hold the parts in this position until the shutter operating key has again been shifted, whereupon its cam 36 will project the forward end of the lever laterally so as to release the projection 31 from its engagement with the wall of the recess 21, whereupon the spring will again throw the shield 22a to its obstructing position.

It is to be particularly noted that until the lever 23 is retracted by winding up the exposed film, the forward extension of the lever 23 projects beyond the trigger or shutter operating device 17 so that this shutter operating device 17 cannot be operated whether the user looks through the finder or not until the exposed portion of the film has been wound up. Winding up the exposed portion of the film causes the retraction of the lever 23 and withdraws it out of the path of movement of the shutter actuating device 17. Thus I have provided positive means for preventing double exposure, locking the shutter actuator 17, and showing visually that the exposed portion of the film has not been wound up.

A very important feature of my invention resides in the fact that my construction is such that the lug 28 when engaged by the lugs on the key 12 is moved entirely out of the path of movement of these lugs 14 so that the key may be rotated after the initial movement of the key without in any way affecting the locking member or lever 23. The locking lever is only shifted back into its position with the lugs 28 in the path of movement of the lugs 23 when the shutter has been snapped.

It will be seen that this device is very simple, that it cannot readily get out of order, that it may be very cheaply made and that it prevents a double exposure inasmuch as until the exposed portion of the film has been wound up the shield will remain in its obstructive position. Inasmuch as the lever 23 and the lever 22 are made of thin metal and disposed between the outer case of the camera and the inner casing or film 10, it is obvious that there will be nothing in this mechanism that can be accidentally broken as it is entirely concealed, cannot be handled and cannot be brought in contact with the fingers unless the outer casing be taken entirely off.

Furthermore inasmuch as this thin metal lever 23 is disposed in the narrow space between the outer casing and the wall of the camera and the lever 22 is disposed within the narrow space between the upper face of the head 20 and the outer case of the camera, these parts will be held from flexing or bending and again only move in the plane of their thickness.

While I have illustrated this device as applied to what is known as a box camera, it will be understood that it may be applied to a folding camera or any other form of camera having a camera head upon which the parts may be mounted and obviously it might be modified in many ways without departing from the spirit of the invention as defined in the appended claims.

I claim:—

1. In a camera, the combination with a shutter mechanism, an actuating device therefor, and a film winding shaft having lugs, a locking member disposed on the side of the camera, and having a rearward extension provided with a hook, a spring projecting the locking member into the path of movement of the shutter actuating device to bring the hook on the locking member into a position where it may be engaged by one of the lugs on the shaft when the latter is rotated to wind up an exposed portion of film, means on the locking member holding the locking member so retracted, the shutter actuating device having means whereby to release the locking member from its retracted position and permit its projection again into a locking position by said spring.

2. In a camera, the combination with a shutter mechanism, an actuating device therefor including a lever projecting beyond the side wall of the camera and operating parallel to the face thereof, and a film winding device, of a locking member disposed on the side of the camera, a spring projecting the locking member into the path of movement of the shutter actuating lever, means actuated by the film winding device retracting said locking member when the winding device has been initially actuated, means holding the locking member retracted including an inward projection on the locking member, the shutter actuating lever having a cam adapted to engage the locking lever and shift it laterally to release said projection and permit the spring to project the locking member into the path of movement of the lever after said lever has passed the locking member.

3. In a camera, the combination with a shutter mechanism, an actuating device therefor and a film winding key having a shaft, of a locking member disposed on the side of the camera and having a rearwardly extending portion formed with a hook and a forwardly extending portion, a spring urging the locking member forward with its forward extension in the path of movement of the shutter actuating device, the shaft of the film winding key having a lug adapted to engage the hook to retract the locking member, the locking member having an inward protuberance, the side wall of the camera having a projecting detent, a protuberance engaging said detent and normally holding the locking member in a retracted position, the shutter actuating device having a lug acting as a cam to shift the locking member laterally outward to release the protuberance from its engagement with the detent and permit the spring to project the locking member forward after the shutter actuating device has passed the locking member.

4. In a camera, the combination with a shutter mechanism, an actuating device therefor, and a film winding key having a radial lug, a locking member disposed on the side of the camera and having a rearwardly extending portion formed with an angular extremity, a spring projecting the locking member in to the path of movement of the shutter actuating device and thus bringing the terminal rear end of the locking member into the path of movement of the lug on the key, whereby when the key is turned to wind up an exposed film, the locking lever will be retracted against the action of said spring, means for holding the locking lever retracted, means on the shutter actuating device for causing the release of said locking lever when the shutter has been actuated, the locking lever being so mounted that as it moves rearward, the rear end of the locking lever will move upward and rearward out of the path of movement of the lug.

5. In a camera, the combination with a shutter mechanism, an actuating device therefor, and a film winding shaft having radially projecting lugs, of a locking member disposed on the side of the camera having a rearward extension provided with a detent tooth, the locking member being shiftable in the direction of its length and simultaneously tiltable in a direction to bring the locking tooth in the path of movement of one of the lugs when the locking member is shifted forward, and out of the path of movement of one of the lugs when the locking member is shifted rearward, a spring projecting the locking member forward into the path of movement of the shutter actuating device, the locking member having a projection on its inside face, a tooth carried by the body of the camera and projecting toward the locking member whereby when the locking member is retracted by the film winding shaft the projection on the locking member will pass the lug and thus hold the locking member in retracted position, and means on the shutter actuating device engaging the locking member to shift it outward and carry its lug away from said tooth to permit the spring to return the locking member to its forwardly projecting position.

6. In a camera, the combination with a shutter mechanism, an actuating device therefor, including a lever operating over the face of the camera and projecting beyond the side wall thereof, a locking member disposed on the side of the camera, the locking member having an arm extending upward, and an arm projecting rearward and having a tooth, a spring supporting the locking member for rearward and tilting movement and urging the locking member forward with its tooth adapted to engage behind one of the lugs of the film winding device, the forward end of the locking member projecting into the path of movement of the actuating lever, a view finder mounted on the camera, a lever carrying a shield, the upper end of the first named arm of the locking member engaging said lever and acting to shift the shield into position over the view finder when the locking member is moving forward and to retract said shield from the view finder when the locking member is moved rearward, means for holding the locking member retracted against the action of said spring, and means on the shutter actuating lever for causing the release of said locking member when the shutter has been actuated.

7. In a camera, the combination with a shutter mechanism, an actuating device therefor, film winding means and a view finder, of a locking member disposed on one side of the camera, a spring projecting the locking member into the path of movement of the shutter actuating device, and film winding means, a shield mounted for movement into position over or away from the view finder, means connected to said locking member for shifting the shield into position over the view finder when the locking member is projected into the path of movement of the shutter actuating device or shifting the shield out of position over the view finder when the locking member is retracted, and means retracting said locking member when the film winding device has been actuated and holding it retracted, the shutter actuating device having means to release the locking member from its retracted position.

In testimony whereof I hereunto affix my signature.

CYRUS W. UNDERWOOD.